(12) United States Patent
Handshaw et al.

(10) Patent No.: US 10,489,623 B1
(45) Date of Patent: Nov. 26, 2019

(54) MULTIPLE IMAGING ASSEMBLY FOR A READER

(71) Applicant: Zebra Technologies Corporation, Lincolnshire, IL (US)

(72) Inventors: Darran Michael Handshaw, Sound Beach, NY (US); Edward Barkan, Miller Place, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 15/988,918

(22) Filed: May 24, 2018

(51) Int. Cl.
  *G03B 7/08* (2014.01)
  *G06K 7/14* (2006.01)
  *G06K 7/10* (2006.01)

(52) U.S. Cl.
  CPC . *G06K 7/1491* (2013.01); *G06K 2007/10524* (2013.01)

(58) Field of Classification Search
  CPC .......... G06K 7/10722; G06K 7/10811; G06K 7/10732
  USPC ..................................................... 235/462.24
  See application file for complete search history.

(56) References Cited

U.S. PATENT DOCUMENTS

2009/0026267 A1* 1/2009 Wang ....................... G06K 7/10
  235/440
2013/0092735 A1* 4/2013 Liu ..................... G06K 7/10851
  235/440
2015/0363619 A1* 12/2015 Lei ..................... G06K 7/10811
  235/455

* cited by examiner

*Primary Examiner* — Ahshik Kim
(74) *Attorney, Agent, or Firm* — Yuri Astvatsaturov

(57) ABSTRACT

An apparatus, method and assembly for minimizing oversaturation of an image of a barcode or other symbol due to specular reflection, and minimizing holes in the images using multiple light-detecting sensors each having a field-of-view (FOV) that intersects the central illumination axis of an illumination source, and that intersects the FOV of the other light-detecting sensor.

71 Claims, 7 Drawing Sheets

MULTIPLE IMAGING ASSEMBLY FOR A READER

BACKGROUND OF THE INVENTION

Existing barcode readers typically utilize a single imaging assembly in the center of the forward face of the reader. This creates a discontinuity in the illumination of the barcode, because the illumination has a "hole" caused by the aperture for the imaging assembly which may appear on the barcode thereby making it unsuitable for decoding. In order to avoid this "hole" in the illumination, a user must tilt the barcode reader with respect to the forward face of the reader, which is often counterintuitive to the user, and not user-friendly. Further, barcodes may reflect the illumination light directly back to the imaging assembly (specular reflection), thereby oversaturating the imaging sensor, and likewise rendering the image unsuitable for decoding. This is particularly acute with direct part markings that are etched or engraved into a product, and tend to reflect the illumination light in several directions. Such direct part markings also have little contrast in the symbol, thereby making them difficult to read with the reader. Readers have been developed that utilize multiple illumination sources to illuminate the barcode. Typically, these illumination assemblies are turned on in succession or in different combinations to try to illuminate the barcode in different ways for imaging by the imaging sensor until an image is captured without the above defects. However, the number of illumination sources and the number of combinations make the process of finding a suitable image slow. Moreover, the illumination sources add to the expense of the reader.

Accordingly, there is a need for a reader that utilizes multiple imaging assemblies rather than multiple illumination sources, which speeds up the process of finding a suitable image of the barcode while minimizing specular reflection and "holes" in the image.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
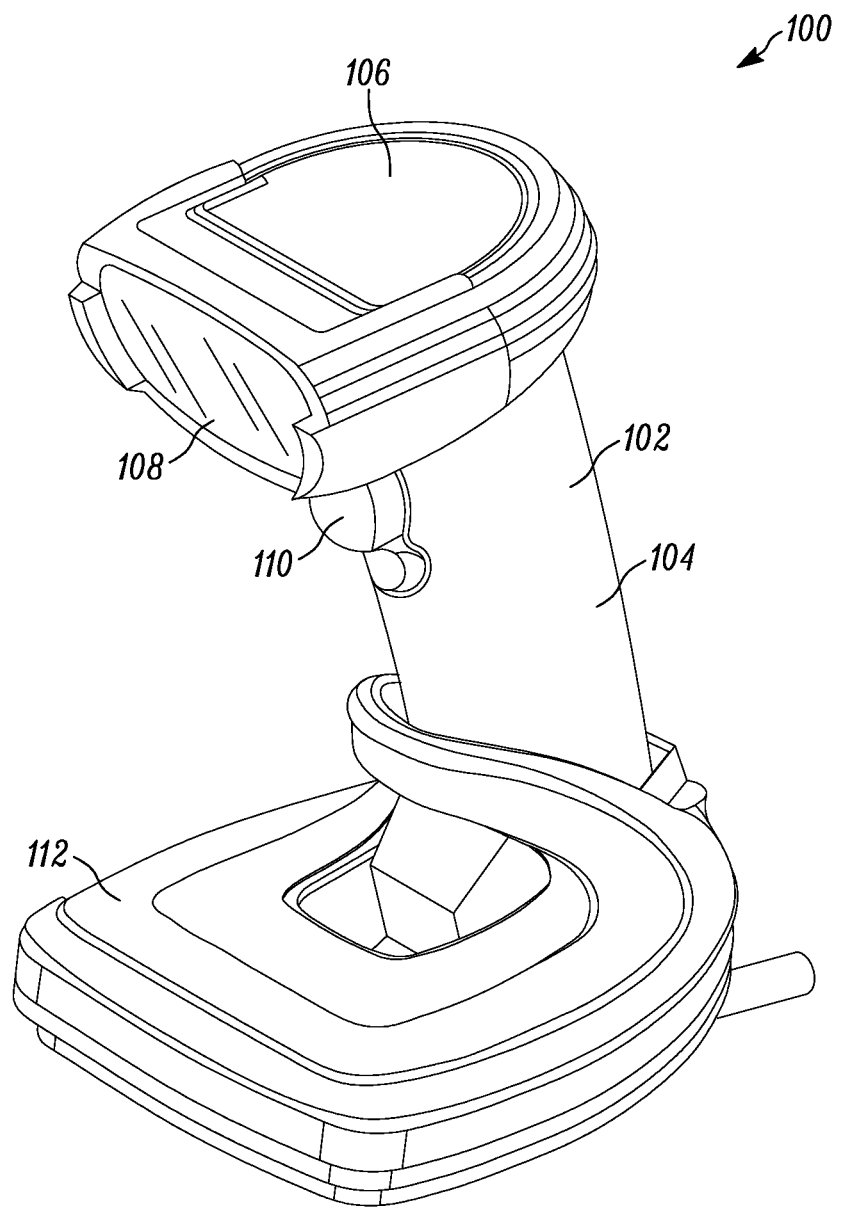
FIG. 1 illustrates a perspective view of a barcode reader according to an embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure provides an apparatus that includes a housing, an illumination source and an imagine engine. The illumination source is at least partially disposed within the housing, and has a central illumination axis. The imaging engine is supported by the housing and includes a first light-detecting sensor and a second light detecting sensor. The first light-detecting sensor is in a first position and has a first field of view that at least partially intersects the central illumination axis at an imaging plane. The second light-detecting sensor is in a second position and has a second field of view that at least partially intersects both the central illumination axis and the first field of view at the imaging plane. At least one of the first and second light detecting sensors is offset from the central illumination axis. Each of the first light-detecting sensor and the second light-detecting sensor is adapted to capture at least one of: light reflected from a target and light emitted from the target. The imaging engine wherein the imaging engine is adapted to read an image from each of the first and second light-detecting sensors.

Another aspect of the present disclosure provides a method that includes emitting light from an illumination source at least partially disposed within a housing, capturing at least one of first light reflected from a target and first light emitted from the target at a first light-detecting sensor at least partially disposed within the housing, capturing at least one of second light reflected from the target and second light emitted from the target at a second light-detecting sensor at least partially disposed within the housing, and reading an image of the captured light from each of the first and second light-detecting sensors. The emitted light has a central imaging axis. The first light is captured within a first field of view of the first light-detecting sensor, and the second light is captured within a second field of view of the second light-detecting sensor. The first field of view at least partially intersecting the central illumination axis at an imaging plane, and the second field of view at least partially intersecting both the central illumination axis and the first field of view at the imaging plane.

Yet another aspect of the present disclosure provides an assembly that includes a housing, an illumination source and an imaging engine. The housing has a scanning head and a handle. The scanning head has an illumination diffuser and a window. The illumination source is disposed within the housing behind the window and at a center of the illumination diffuser. The illumination source is arranged to emit light and the illumination diffuser arranged to diffuse the emitted light. The diffused emitted light having a central illumination axis. The imaging engine is supported by the scanning head and includes a plurality of light-detecting sensors disposed equidistant about the central illumination axis and proximate a perimeter of the illumination diffuser. Each light-detecting sensor: 1) has a different field of view extending through the window, and 2) is adapted to capture at least one of: light reflected from a target and light emitted from the target. Each field of view at least partially intersecting the central illumination axis and each other field of view at an imaging plane. The imaging engine is adapted to read an image from each of the plurality of light-detecting sensors.

Referring now to the drawings, FIG. 1 illustrates an exemplary barcode reader 100 having a housing 102 with a handle portion 104, also referred to as a handle 104, and a head portion 106, also referred to as a scanning head 106. The head portion 106 includes a window 108, and is configured to be positioned on the top of the handle portion 104. The handle portion 104 is configured to be gripped by a reader user (not shown) and includes a trigger 110 for activation by the user. Included in the embodiment is also a base 112 attached to the handle portion 104 opposite the head portion 106. The base 112 is configured to stand on a surface and support the housing 102 in a generally upright position. The barcode reader 100 can be used in a hands-free mode as a stationary workstation when it is placed on the countertop. The barcode reader 100 can also be used in a handheld mode when it is picked up off the countertop and held in an operator's hand. In the hands-free mode, products can be slid, swiped past, or presented to the window 108. In the handheld mode, the barcode reader 100 can be moved towards a barcode on a product, and the trigger 110 can be manually depressed to initiate imaging of the barcode. In some implementations, the base 112 can be omitted, and the housing 102 can also be in other handheld shapes. Other implementations may provide only handheld or only hands-free configurations.

Figure 2A:
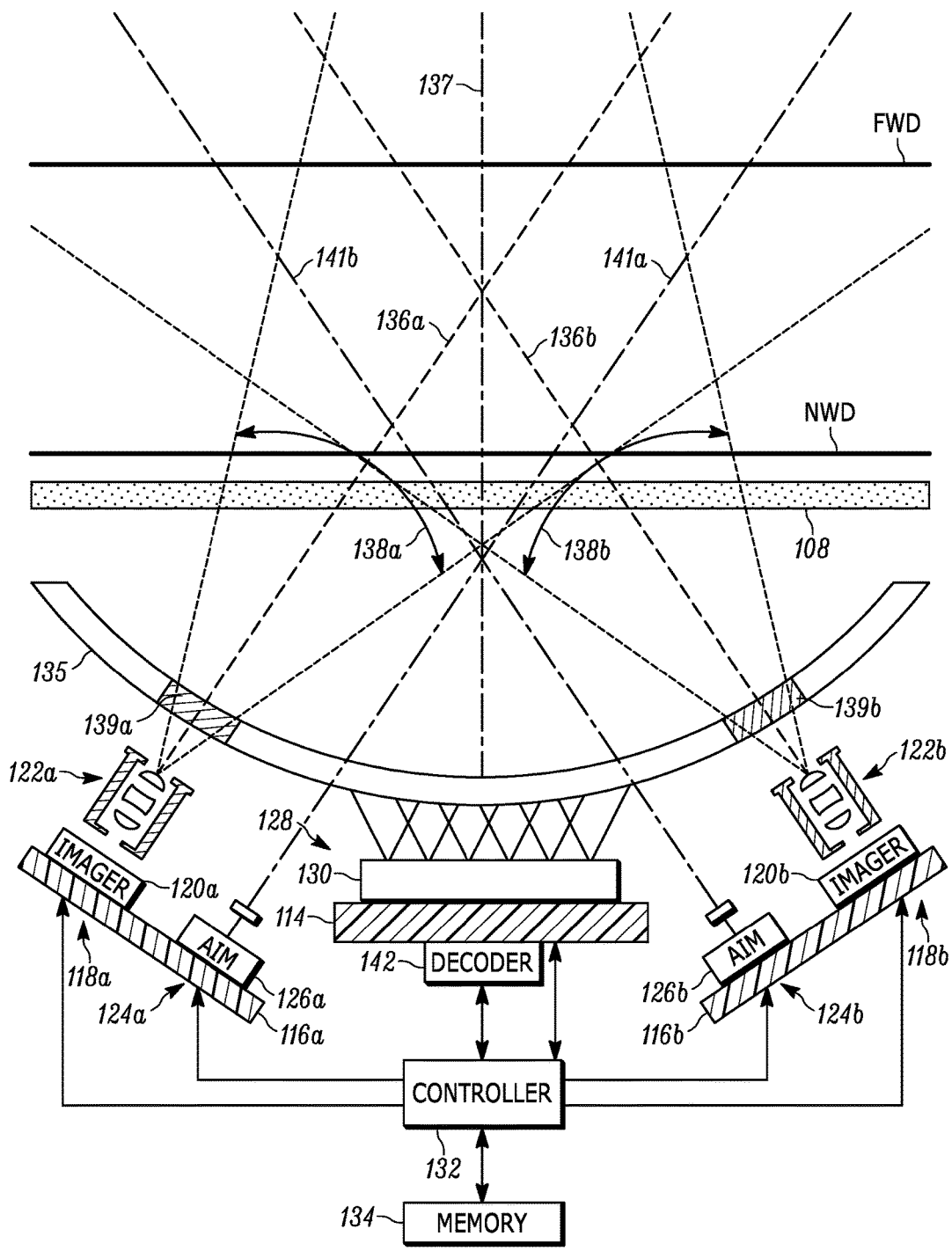
FIG. 2A illustrates a block schematic diagram of some of the components of the barcode reader of FIG. 1 according to an embodiment of the present invention.
Figure 2B:
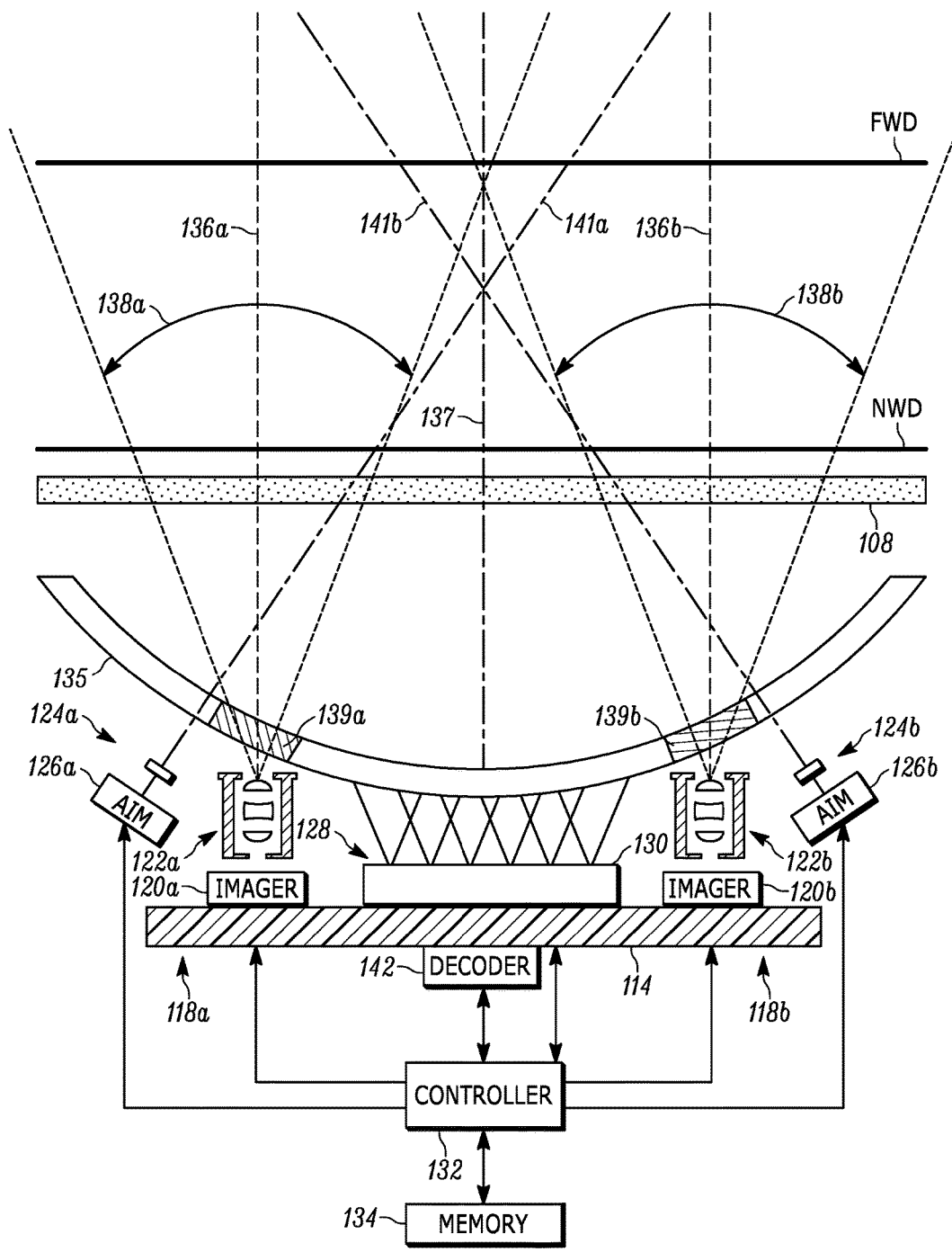
FIG. 2B illustrates a block schematic diagram of some of the components of the barcode reader of FIG. 1 according to another embodiment of the present invention.

FIGS. 2A and 2B each illustrate a block schematic diagram of a portion of a barcode reader 100 in accordance with some embodiments. It should be understood that FIGS. 2A and 2B are not drawn to scale. The barcode reader 100 in FIG. 2A includes: (1) a first circuit board 114; (2) second circuit boards 116a and 116b; (3) a first imaging assembly 118a that includes a first imaging sensor 120a, and a first imaging lens assembly 122a; (4) a second imaging assembly 118b that includes a second imaging sensor 120b, and a second imaging lens assembly 122b; (5) a first aiming assembly 124a that includes a first aiming light source 126a; (6) a second aiming assembly 124b that includes a second aiming light source 126b; (7) an illumination assembly 128 that includes an illumination light source 130; (8) a controller 132; (9) a memory 134; and (10) a diffuser 135. The barcode reader 100 in FIG. 2B includes: (1) a first circuit board 114; (2) a first imaging assembly 118a that includes a first imaging sensor 120a, and a first imaging lens assembly 122a; (3) a second imaging assembly 118b that includes a second imaging sensor 120b, and a second imaging lens assembly 122b; (4) a first aiming assembly 124a that includes a first aiming light source 126a; (5) a second aiming assembly 124b that includes a second aiming light source 126b; (6) an illumination assembly 128 that includes an illumination light source 130; (7) a controller 132; (8) a memory 134; and (9) a diffuser 135.

The imaging sensors 120a and 120b can be either CCD or CMOS imaging sensors that generally include multiple photosensitive pixel elements aligned in one-dimensional array for linear sensors or two-dimensional array for two-dimensional sensors. Each imaging sensor 120a, 120b is operative to detect light captured by the respective imaging lens assembly 122a, 122b along an optical path or central field of view (FOV) axis 136a, 136b through the window 108. Generally, each imaging sensor 120a, 120b and imaging lens assembly 122a, 122b pair is designed to operate together for capturing light scattered, reflected, or emitted from a barcode as pixel data over a one-dimensional or two-dimensional FOV 138a, 138b that extends between a near working distance (NWD) and a far working distance (FWD). NWD and FWD denote the distances between which each imaging assembly 118a and 118b is designed to read barcodes. In some embodiments, the NWD is between approximately 0 and approximately 1 centimeter from the window 108 and the FWD is between approximately 5 and approximately 15 centimeters from the window 108. In other examples, these distances may be measured from the nose of the reader 100.

Each imaging sensor 120a, 120b is operated by the controller 132, such as a microprocessor, that is communicatively connected thereto. Additionally, the controller 132 is communicatively connected to the aiming light sources 126a, 126b, the illumination light source 130, and the memory 134. Although the link between these components is illustrated as a single communication buses, this is merely illustrative, and any communication link between any of the devices may either be dedicated or may include more than the selected devices. Additionally, placement of components on either side of any of the circuit boards 114, 116a, 116b is similarly exemplary. In operation, the memory 134 can be accessible by the controller 132 for storing and retrieving data, such as image frame data. In some embodiments, the first circuit board 114 also includes a decoder 142 for decoding one or more barcodes that are captured by the imaging sensors 120a, 120b. The decoder 142 can be implemented within the controller 132 or as a separate module 142.

As indicated above, the illumination light source 130 is communicatively connected to the controller 132, and is activated by the controller 132 in response to a user actuating the trigger 110 in a handheld mode. In a hands-free mode, the controller 132 continuously activates the illumination light source 130. The illumination light source 130 is operative to emit light through the window 108 along an optical path or central (or centroidal) illumination axis 137 through the window 108. The illumination light source 130 may be a single light source, such as a light emitting diode (LED), or an array of light sources, such as an array of LEDs. Preferably, however, the illumination light source 130 uniformly illuminates most or all of the diffuser 135, which, in turn, diffuses the light from the illumination source 130 across an illumination field of view (not shown) to illuminate a barcode within the illumination FOV.

The diffuser 135 has an aperture 139a, 139b for each imaging assembly 118a, 118b such that the FOV 138a, 138b of each imaging assembly 118a, 118b extends through the window 108. As shown in the embodiments of FIGS. 2A and 2B, the imaging assemblies 118a, 118b are behind the diffuser 135. In other embodiments, the imaging assemblies 118a, 118b are at least partially disposed within the apertures 139a, 139b. For example, the imaging lens assemblies 122a, 122b may extend into, and even through, the apertures 139a, 139b. In any event, it is preferred that the FOVs 138a, 138b of the imaging assemblies 118a, 118b are not obstructed by the diffuser 135.

As depicted in the embodiment of FIG. 2A, the imaging assemblies 118a, 118b are positioned off-axis from the illumination assembly 130 and tilted at diverse angles, such that the FOV of each imaging assembly 118a, 118b better covers the working distance in front of the window. Consequently, the central FOV axis 136a, 136b for each imaging sensor 120a, 120b is non-parallel to the central illumination axis 137, and non-parallel to each other. More particularly, the central FOV axes 136a, 136b are tilted towards the central illumination axis 137. Thus, one or both imaging sensors 120a, 120b may capture an image of the barcode suitable for decoding, even when the barcode is small and/or positioned close to the reader 100. Further, having multiple imaging sensors 120a, 120b, decreases the chances that a barcode will send redirected light directly into both imaging sensors 120a, 120b at the same time. Still further, the apertures 139a, 139b are positioned near the outer perimeter of the diffuser 135. This makes it less likely that illumination "holes" will appear in the image of the barcode.

As depicted in the embodiment of FIG. 2B, the imaging assemblies 118a, 118b are also positioned off-axis from the illumination assembly 130, but are oriented such that the central FOV axis 136a, 136b for each imaging sensor 120a, 120b is parallel to the central illumination axis 137, and parallel to each other. More particularly, the imaging assemblies 118a, 118b are mounted on a circuit board or other substrate parallel to the circuit board 114 upon which the illumination assembly 130 is mounted, thereby causing the central FOV axes 136a, 136b to be parallel to the central illumination axis 137. As shown in FIG. 2B, the imaging assemblies 118a, 118b are mounted on the same circuit board 114 as the illumination assembly 130. One or both imaging sensors 120a, 120b may capture an image of the barcode suitable for decoding, even when the barcode is small and/or positioned close to the reader 100. Again, having multiple imaging sensors 120a, 120b, decreases the chances that a barcode will send redirected light directly into both imaging sensors 120a, 120b at the same time. The apertures 139a, 139b are likewise positioned near the outer perimeter of the diffuser 135, making it less likely that illumination "holes" will appear in the image of the barcode.

Figure 3A:
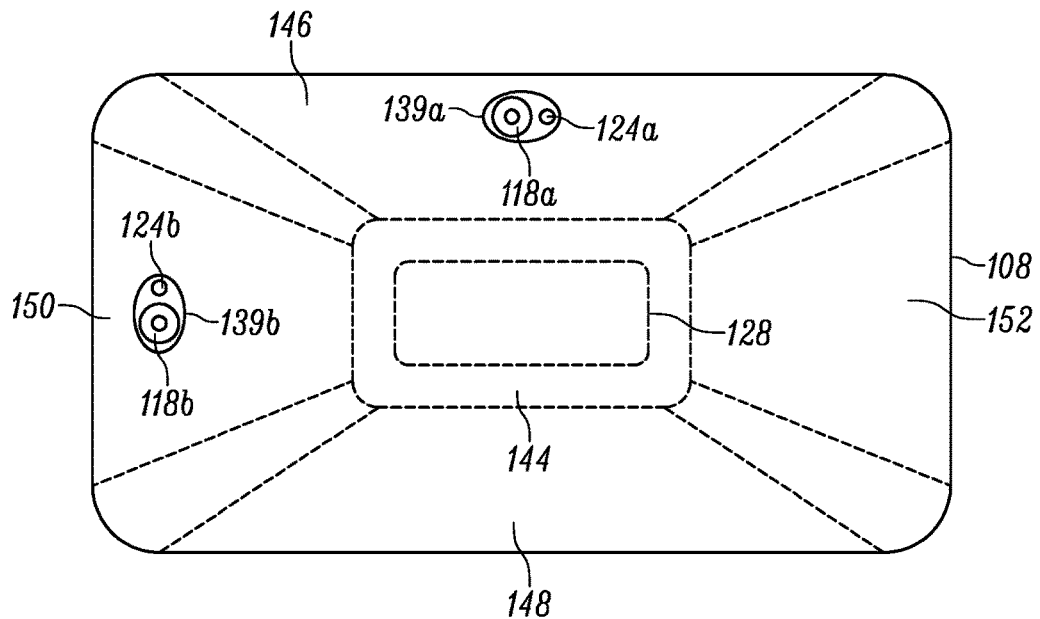
FIG. 3A illustrates a frontal view of the scanning head of the barcode reader of FIG. 1 according to an embodiment of the present invention.
Figure 3B:
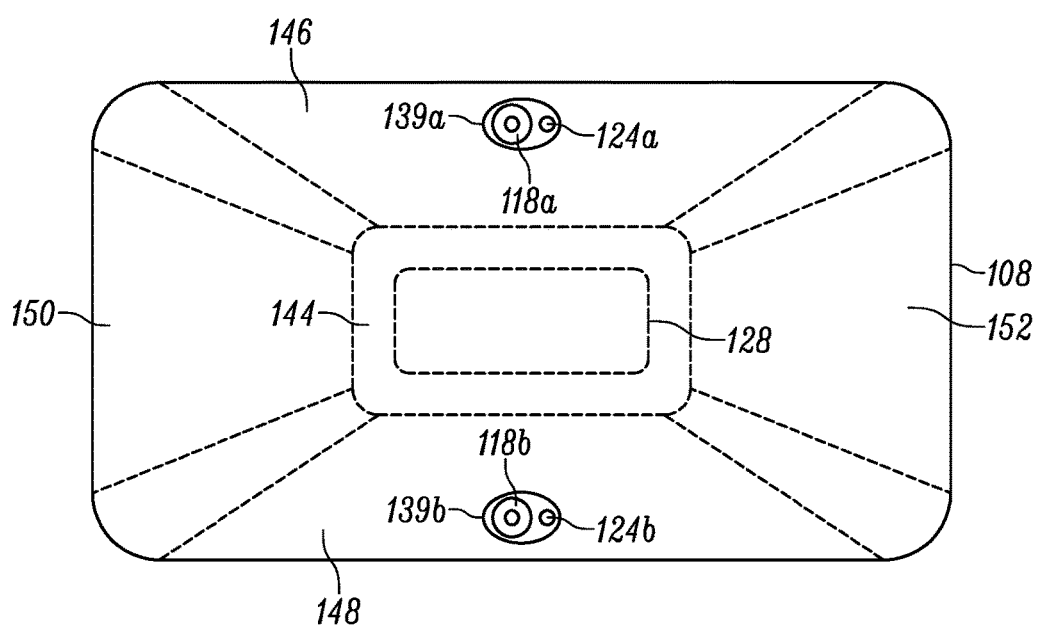
FIG. 3B illustrates a frontal view of the scanning head of the barcode reader of FIG. 1 according to another embodiment of the present invention.
Figure 3C:
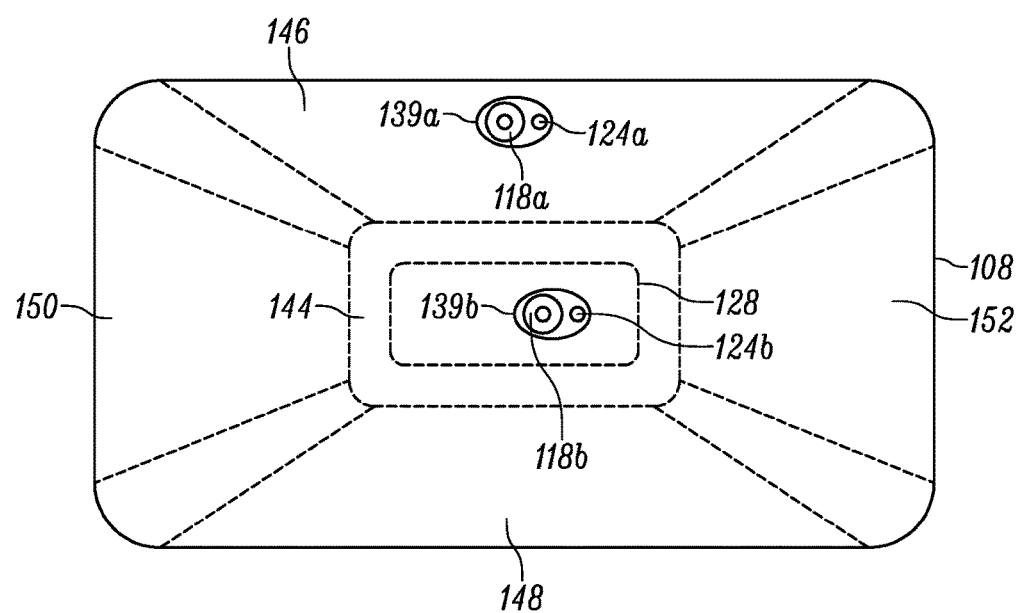
FIG. 3C illustrates a frontal view of the scanning head of the barcode reader of FIG. 1 according to yet another embodiment of the present invention.

In another embodiment, as will be seen with respect to FIG. 3C, one of the imaging assemblies 118a is positioned off-axis from the illumination assembly 130 as described above, whereas the other imaging assembly 118b is adjacent the illumination assembly 130. Consequently, the central FOV axis 136a for the imaging sensor 120a is non-parallel to, and tilted towards, both the central illumination axis 137 and the FOV axis 136b for the imaging sensor 120b, whereas the central illumination axis 137 and the FOV axis 136b are parallel to each other. This embodiment makes it more likely that the barcode reader 100 can capture an image of both direct part markings and other barcodes, including barcodes on curved surfaces and barcodes on flat surfaces.

The first and second aiming sources 126a, 126b are also communicatively connected to the controller 132, and are activated by the controller 132 in response to a user actuating the trigger 110 in a handheld mode. In a hands-free mode, the controller 132 continuously activates the first and second aiming sources 126a, 126b. Each aiming source 126a, 126b is operative to emit light through the window 108 along an optical path or aiming axis 141a, 141b. Each aiming source 126a, 126b may be a single light source, such as a light emitting diode (LED), or an array of light sources that produce an image (e.g., a shape, line, pattern, etc.), such as multiple LEDs arrayed for a desired image. In other embodiments, a stencil may be used to create an image.

In general, the light emitted from the aiming assemblies 124a, 124b is collimated so as to provide a clear dot or image. Further, the aiming assemblies 124a, 124b may be positioned proximate the respective imaging assemblies 118a, 118b, such as towards the outer perimeter of the diffuser 135, and tilted so as to emit the dot or image towards the central illumination axis 137, such that the dots and/or images intersect one another at an optimal working distance from which to capture an image of the barcode for decoding. This allows the user of the barcode reader 100 to vary the distance between the barcode and the reader 100, until the aimers intersect on the barcode due to parallax, thereby giving the user a visual indication as to how far away the reader 100 should be from the barcode. The optimal working distance may be any distance from the NWD to the FWD, and, more particularly, may correspond to the intersection of the aiming axes 141a, 141b. or any other distance that is the ideal resolution for which the barcode reader 100 is designed to read, such as a distance corresponding to minimal specular reflections (e.g., for direct part marking). The dot or image from each aiming assembly 124a, 124b may be the same or different. If the same, the dots or images may substantially or completely overlay one another at the optimal working distance. If different, the dot or image from each aiming assembly 124a, 124b may be complementary. For example, the first aiming assembly 124a may project a dot whereas the second aiming assembly may project a circle, such that the dot fits inside the circle at the optimum distance. In another example, the two patterns may each be partial patterns that come together at the optimal working distance to form a complete pattern, such as two semicircles that come together to form a circle. In any event, the dot or image from each aiming assembly 124a, 124b produces a visual indication indicating the optimal distance from the reader 100 at which to scan the target, where the visual indication is defined by both illuminated and un-illuminated portions that are bounded by an upper and lower horizontal boundaries, and a right and left vertical boundaries.

Figure 4A:
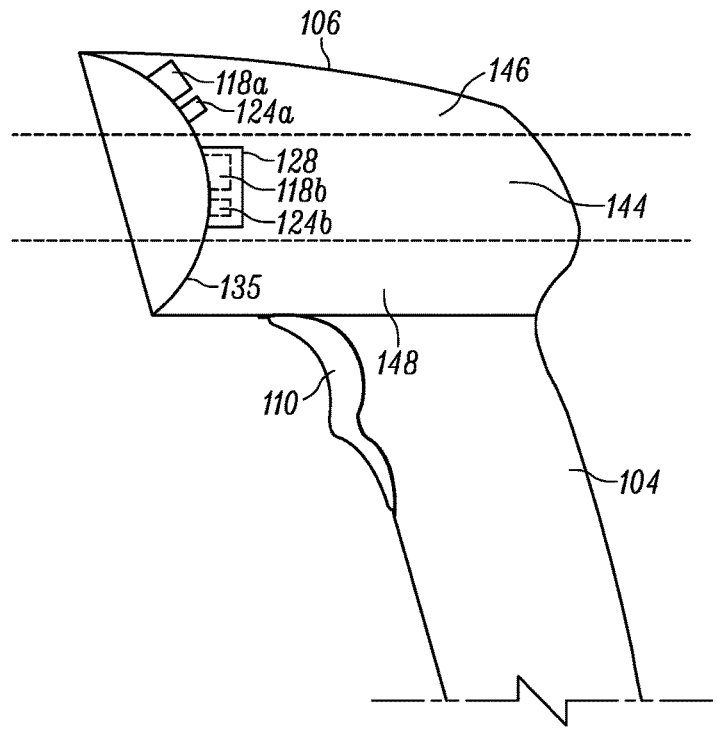
FIG. 4A illustrates a cross-sectional side view of the scanning head of FIG. 3A.
Figure 4B:
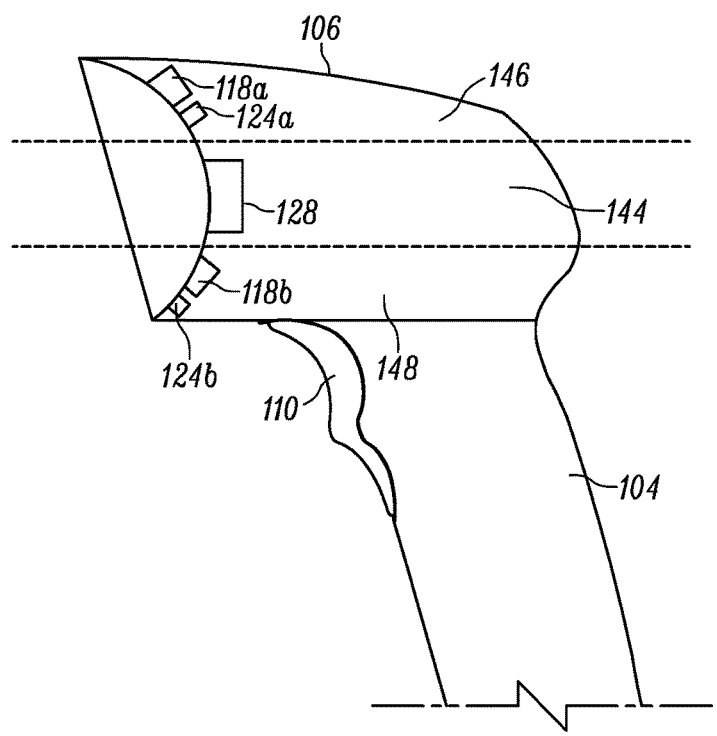
FIG. 4B illustrates a cross-sectional side view of the scanning head of FIG. 3B.

FIGS. 3A, 3B and 3C are frontal views of the scanning head 106 of embodiments of the barcode reader 100 of FIG. 1, and FIGS. 4A and 4B are side views of the scanning head 106 of the embodiments of FIGS. 3A and 3B, respectively. It is noted that a side view of the scanning head 106 of the embodiment of FIG. 3C is substantially similar to that of FIG. 4B, and therefore is not shown separately. More particularly, FIGS. 3A, 3B and 3C are views of the front of the scanning head 106 at an angle perpendicular to the central illumination axis 137. As shown therein, the scanning head 106 conceptually has multiple regions as depicted on the window 108, including, but not limited to, a central region 144, a top region 146, a bottom region 148, a left side region 150, and a right side region 152. Of course, it will be understood that the regions as defined in FIGS. 3A, 3B, 3C, 4A and 4B are exemplary only, and are used herein as a mechanism to explain embodiments of placement of the image assemblies 118a, 118b with respect to one another.

Generally, the imaging assemblies 118a, 118b are positioned apart relative to one another such that there is minimum overlap or intersection of the corresponding FOV central axes 136a, 136b between the NWD and the FWD. In one embodiment, the imaging assemblies 118a, 118b are positioned relative to one another about the central illumination axis 137 between approximately 45° and approximately 135°. As shown in FIG. 3A, the first imaging assembly 118a is disposed at an approximately 90° angle relative to the second imaging assembly 118b about the central illumination axis 137. In another embodiment, the imaging assemblies 118a, 118b may be separated by a particular distance along the plane perpendicular to the central illumination axis, such as at least 2 centimeters apart.

In the embodiment of FIGS. 3A and 4A, the illumination assembly 128 is disposed in the central region 144 of the scanning head 106 behind the diffuser 135 so as to uniformly distribute light across the diffuser 135. The first imaging assembly 118a is positioned in the top region 146 behind or partially within the first aperture 139a, while the second imaging assembly 118b is positioned in the left side region 150 behind or partially within the second aperture 139b, which is approximately 90° relative to the first imaging assembly 118a about the central illumination axis 137. Of course, positioning the imaging assemblies 118a, 118b 90° relative to one another may also result in the first imaging assembly 118a being disposed in the bottom region 146 and/or the second imaging assembly 118b being disposed in the right side region 150. Similarly, the first aiming assembly 124a is disposed proximate the first imaging assembly 118a, and the second aiming assembly 124b is disposed proximate the second imaging assembly 118b.

In the embodiment of FIGS. 3B and 4B, the illumination assembly 128 is likewise disposed in the central region 144 of the scanning head 106 behind the diffuser 135 so as to uniformly distribute light across the diffuser 135. In this embodiment, the first imaging assembly 118a is positioned in the top region 146 behind or partially within the first aperture 139a, while the second imaging assembly 118b is positioned in the bottom region 148 behind or partially within the second aperture 139a, which is approximately 180° relative to the first imaging assembly 118a about the central illumination axis 137. In other embodiments, positioning the imaging assemblies 118a, 118b 180° relative to one another may also result in the first imaging assembly 118a being disposed in the left side region 150 and the second imaging assembly 118b being disposed in the right side region 152. As in the embodiment of FIGS. 3A and 4A, the first aiming assembly 124a is disposed proximate the first imaging assembly 118a, and the second aiming assembly 124b is disposed proximate the second imaging assembly 118b.

In the embodiment of FIG. 3C, the illumination assembly 128 is again disposed in the central region of the scanning head 106 behind the diffuser 135 so as to uniformly distribute light across the diffuser 135. In this embodiment, the first imaging assembly 118a is positioned in the top region 146 behind or partially within the first aperture 139a, while the second imaging assembly 118b is positioned in the central region 144 behind or partially within the second aperture 139a and adjacent the illumination assembly 128. In other embodiments, the imaging assembly 118b remains in the central region 144 adjacent the illumination assembly 128, whereas the imaging assembly 118a may be disposed in the lower region 148, or either side regions 150, 152. As in the above embodiment, the first aiming assembly 124a is disposed proximate the first imaging assembly 118a, and the second aiming assembly 124b is disposed proximate the second imaging assembly 118b.

Figure 5:
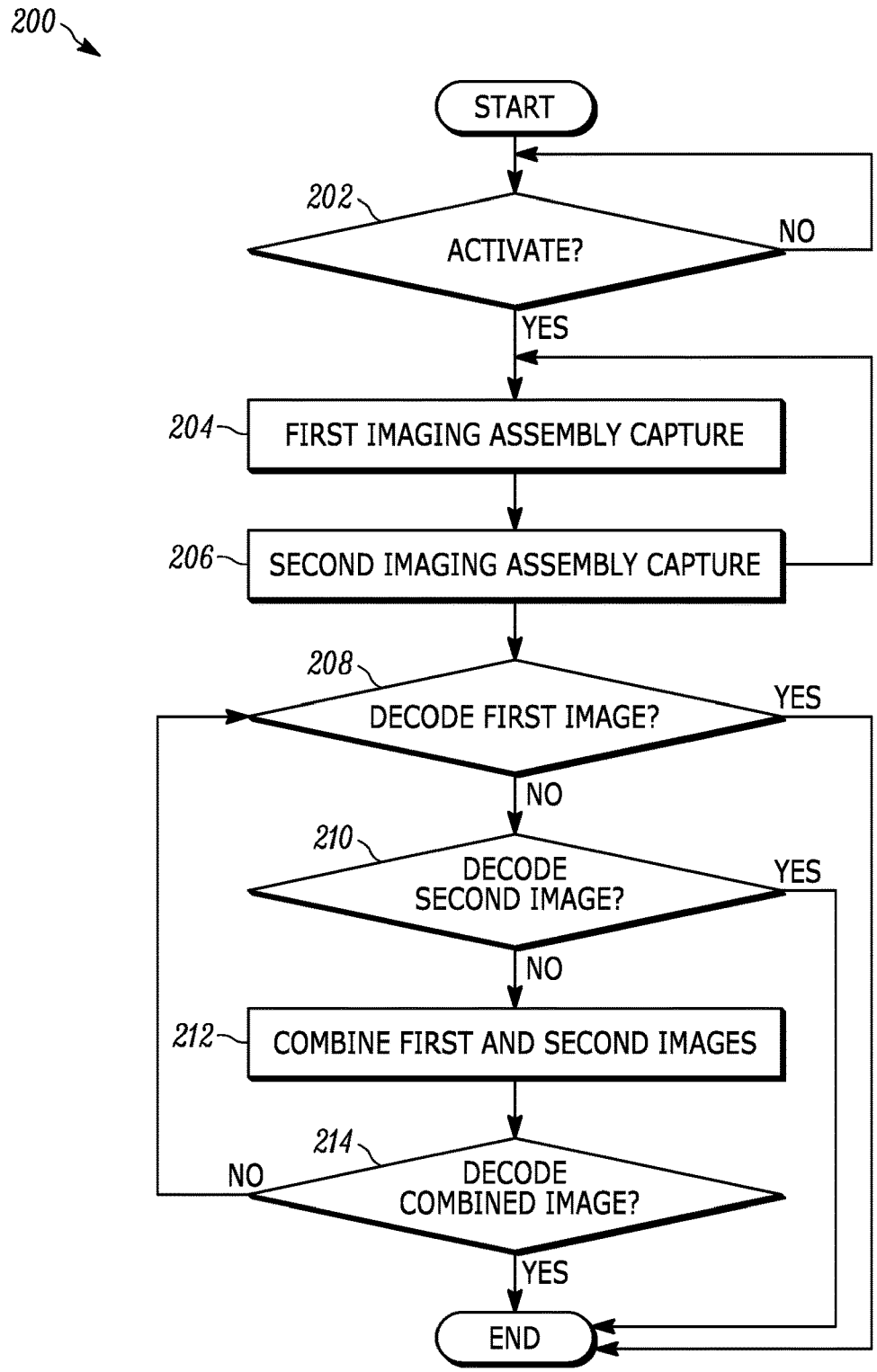
FIG. 5 illustrates a flowchart of a routine for processing images captured by the barcode reader to FIG. 1.

FIG. 5 is a flowchart of a routine 200 for imaging and reading a barcode or other symbol positioned between the NWD and the FWD. Again, the near working distance may range from approximately zero to approximately one centimeter from the window 108, and the far working distance may range from approximately five to approximately fifteen centimeters from the window 108, particularly for direct product marking codes. However, it will be understood that different distances may be used for different types of symbols, including symbols on a curved surface.

Beginning at step 202, the illumination assembly 128 is activated, either by actuating the trigger 110 in a handheld mode or by placing the reader 100 in a hands-free mode. At the same time, the aiming assemblies 124a, 124b may provide aiming lights that intersect within the working space between the near working distance and the far working distance, where the intersection represents the optimal distance from the window 108 from which to read a barcode, such as the focus of the imaging sensors 120a, 120b. When a target, such as a barcode, is placed within the near working range and the far working range, and, more particularly, at the intersection of the aiming lights, light is reflected off of, or emitted from, the target back to the imaging assemblies 118a, 118b.

At step 204, the first imaging assembly 118a captures light that is reflected or emitted from the barcode within the first FOV 138a that is at the same wavelength as the light emitted from the illumination assembly 128. At step 206, the second imaging assembly 118b captures light that is reflected or emitted from the barcode within the second FOV 138b that is at the same wavelength as the light emitted from the illumination assembly 128. The light received by the first and second imaging assemblies 118a, 118b provide image data of any target within the respective FOVs 138a, 138b, which would include the barcode placed within the working distance outside the window 108. In an embodiment, the imaging sensors 120a, 120b alternate in capturing images of a target within their respective FOVs 138a, 138b. For example, the imaging sensors 120a, 120b may each operate at 60 frames per second, meaning that an image is alternately taken by one of the imaging sensors 120a, 120b every $\frac{1}{30}^{th}$ of a second. With each frame taken by the imaging sensors 120a, 120b, the image frame data may be stored in the memory 134 for decoding by the processor 132. In one embodiment, the image frame data of the first imaging sensor 120a is stored separately from the image frame data of the second imaging sensor 120b, such as in different partitions of the memory 134 or in separate memories.

The processor 132 then reads the image frame data from the memory 134 and attempts to decode the barcode in the image frame data, first from the first imaging sensor 120a (step 208) and then from the second imaging sensor 120b (step 210). Thus, if the image data from one imaging sensor does not yield a suitable image of a barcode for decoding (i.e., the processor 132 is unable to decode the image), the processor 132 moves on to the image data from the other imaging sensor. For example, the angle at which the barcode reader 100 is held towards the barcode may result in light from the illumination assembly 128 reflecting off the barcode directly back into the first imaging sensor 120a, which oversaturates the first imaging sensor 120a and yields an unsuitable image of the symbol for decoding. However, given the diversity of angles between the two imaging sensors 120a, 120b, it is unlikely that light will be similarly reflected directly back to the second imaging sensor 120b, so the processor 132 will attempt to decode the barcode in the image frame data from the second imaging sensor 120b. Similarly, oversaturation of the second imaging sensor 120b results in the processor 132 attempting to decode the barcode in the image frame data from the first imaging sensor 120a.

Optionally, in the event that neither the image frame data from the first imaging sensor 120a nor the image frame data from the second imaging sensor 120b yields a suitable image of a barcode for decoding (e.g., each imaging sensor 120a, 120b was only able to obtain part of an image of the barcode), the processor 132 may still use the image frame data from each imaging sensor 120a, 120b to decode the barcode. For example, if the image frame data from one imaging sensor has a "hole" in the image of the barcode, whereas the image frame data from the other image sensor is only part of the barcode, but includes an image of the area where the "hole" occurs in the first image, then the image frame data of both together yields a complete image of the barcode. In another example, specular reflection in both images of the barcode may still together yield a complete, usable image of the barcode.

In an embodiment, the processor 132 attempts to combine the two image frames (step 212) so as to create a combined image that is a suitable image of the barcode. As such, if each imaging sensor 120a, 120b is able to get a partial image of the barcode, such that the two images may be combined to provide a full image of the barcode, then the combined image may be suitable for decoding (step 214). In another embodiment of step 212, the processor 132 may partially decode the barcode in the image frame data from each of the imaging sensors 120a, 120b, and combine the resulting decoded data to yield a full decode of the barcode.

Further, because the apertures 139a, 139b for the imaging assemblies 118a, 118b are toward the perimeter of the diffuser 135, any "holes" in the image frame data due to illumination from the diffuser 135 casting images of the apertures 139a, 139b are unlikely to appear on the image of the barcode. Even in the event the first aperture 139a projects a "hole" onto the image of the barcode captured by the first imaging sensor 120a, it is unlikely that the second aperture 139b will project a "hole" onto the image of the barcode captured by the second imaging sensor 120b. By alternately reading and attempting to decode the image frame data from the first and second imaging sensors 120a, 120b, or combining the image frame data from the first and second imaging sensors 120a, 120b, there is a greater probability that the processor 132 will quickly find a suitable image of the barcode for decoding, even for difficult-to-read barcodes such as direct part markings, and the first image of the barcode that the processor 132 is able to decode is the one that is used by the reader 100.

As will be understood, more than two imaging assemblies 118a, 118b may be utilized with the reader 100 consistent with the above disclosure. The use of multiple imaging assemblies 118a, 118b allows for faster processing and decoding of the images of the barcode than with a single imaging assembly with alternating illumination sources and/or combinations of illumination. Imaging assemblies 118a, 118b are also less expensive than illumination assemblies.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising:
   a housing;
   an illumination source at least partially disposed within the housing, and having a central illumination axis;
   an imaging engine supported by the housing, the imaging engine including:
      a first light-detecting sensor in a first position and having a first field of view that at least partially intersects the central illumination axis at an imaging plane, the first light-detecting sensor adapted to capture at least one of: light reflected from a target and light emitted from the target; and
      a second light-detecting sensor in a second position and having a second field of view that at least partially intersects both the central illumination axis and the first field of view at the imaging plane, the second light-detecting sensor adapted to capture at least one of: light reflected from the target and light emitted from the target; and
      a first memory partition and a second memory partition,
   wherein the imaging engine is adapted to read an image from each of the first and second light-detecting sensors, and
   wherein at least one of the first and second light detecting sensors is offset from the central illumination axis,
   wherein each image comprises an image of at least part of a symbol,
   wherein the imaging engine is adapted to store the image from the first light-detecting sensor in the first memory partition, and store the image from the second light-detecting sensor in the second memory partition, and
   wherein the imaging engine is further adapted to read the image of at least part of the symbol from each of the first and second light-detecting sensors.

2. The apparatus of claim 1, wherein the imaging engine is adapted to alternately attempt to decode at least part of the symbol in the image of from the first light-detecting sensor and attempt to decode at least part of the symbol in the image of from the second light-detecting sensor, wherein the imaging engine is adapted to read information from the image of at least part of the symbol decoded first.

3. The apparatus of claim 1, wherein the imaging engine is adapted to combine the image of part of the symbol from the first light-detecting sensor with the image of part of the symbol from the second light-detecting sensor to form a complete image of the symbol, and read the combined image.

4. The apparatus of claim 1, wherein the imaging engine is adapted to decode the at least part of the symbol in the image from the first light-detecting sensor and decode the at least part of the symbol in the image from the second light-detecting sensor, wherein the imaging engine is adapted to combine information decoded from each part of the symbol.

5. The apparatus of claim 1, wherein the symbol comprises at least one of: a direct part mark and a symbol provided on a curved surface.

6. The apparatus of claim 1, further comprising a speaker operatively coupled to the imaging engine, wherein the imaging engine is adapted to generate a signal to cause the speaker to emit an audible signal when the imaging engine reads the image from the first and/or second light-detecting sensors.

7. The apparatus of claim 1, wherein the first light-detecting sensor is disposed 90 degrees relative to the second light-detecting sensor about the central illumination axis.

8. The apparatus of claim 1, wherein the first light-detecting sensor is disposed 180 degrees relative to the second light-detecting sensor about the central illumination axis.

9. The apparatus of claim 1, wherein the first light-detecting sensor is disposed at least 1 centimeter away from the second light-detecting sensor along a plane perpendicular to the central illumination axis.

10. The apparatus of claim 1, further comprising:
    a first aiming unit adapted to project a first image that at least partially intersects the central illumination axis at the imaging plane; and
    a second aiming unit adapted to project a second image that at least partially intersects the first image and partially intersects the central illumination axis at the imaging plane.

11. The apparatus of claim 10, wherein the first aiming unit is disposed proximate the first light-detecting sensor and the second aiming unit is disposed proximate the second light-detecting sensor.

12. The apparatus of claim 10, wherein the first aiming unit is disposed 90 degrees relative to the second aiming unit about the central illumination axis.

13. The apparatus of claim 10, wherein the first aiming unit is disposed 180 degrees relative to the second aiming unit about the central illumination axis.

14. The apparatus of claim 1, further comprising an illumination diffuser supported by the housing and having a first aperture and a second aperture, wherein the illumination diffuser is adapted to uniformly diffuse light emitted from the illumination source towards the target.

15. The apparatus of claim 14, wherein:
    the first light-detecting sensor is adapted to capture at least one of: light reflected from the target and light emitted from the target through the first aperture, and
    the second light-detecting sensor is adapted to capture at least one of: light reflected from the target and light emitted from the target through the second aperture.

16. The apparatus of claim 14, wherein:
    the first light-detecting sensor is disposed at least partially within the first aperture, and
    the second light-detecting sensor is disposed at least partially within the second aperture.

17. A method comprising:
    emitting light from an illumination source at least partially disposed within a housing, wherein the emitted light has a central imaging axis;
    capturing at least one of first light reflected from a target and first light emitted from the target at a first light-detecting sensor at least partially disposed within the housing, wherein the first light is captured within a first field of view of the first light-detecting sensor, the first field of view at least partially intersecting the central illumination axis at an imaging plane;

capturing at least one of second light reflected from the target and second light emitted from the target at a second light-detecting sensor at least partially disposed within the housing, wherein the second light is captured within a second field of view of the second light-detecting sensor, the second field of view at least partially intersecting both the central illumination axis and the first field of view at the imaging plane;

reading an image of the captured light from each of the first and second light-detecting sensors, wherein each image comprises an image of at least part of a symbol, and where reading the image of the captured light comprises reading the image of the symbol from each of the first and second light-detecting sensors;

combining the image of part of the symbol from the first light-detecting sensor with the image of part of the symbol from the second light-detecting sensor to form a combined image of the symbol; and reading the combined image.

18. The method of claim 17, further comprising:
alternately attempting to decode: 1) at least part of the symbol in the image from the first light-detecting sensor, and 2) at least part of the symbol in the image from the second light-detecting sensor; and
reading information from the image of at least part of the symbol decoded first.

19. The method of claim 17, further comprising:
decoding: 1) at least part of the symbol in the image from the first light-detecting sensor, and 2) at least part of the symbol in the image from the second light-detecting sensor;
combining information decoded from each part of the symbol to form combined decoded information; and
reading the combined decoded information.

20. The method of claim 17, wherein the symbol comprises at least one of: a direct part mark and a symbol provided on a curved surface.

21. The method of claim 17, further comprising:
emitting an audible signal upon reading the image from the first and/or second light-detecting sensors.

22. The method of claim 17, further comprising:
projecting a first image that intersects the central illumination axis at the imaging plane;
projecting a second image that intersects first image and the central illumination axis at the imaging plane.

23. The method of claim 22, wherein:
the first image is projected from a first aiming illumination source proximate the first light-detecting sensor, and
the second image is projected from a second aiming illumination source proximate the second light-detecting sensor.

24. An assembly comprising:
a housing having a scanning head and a handle, the scanning head having an illumination diffuser and a window;
one or more memories collectively partitioned into a plurality of memory partitions;
an illumination source disposed within the housing behind the window and at a center of the illumination diffuser, the illumination source arranged to emit light and the illumination diffuser arranged to diffuse the emitted light, the diffused emitted light having a central illumination axis; and an imaging engine supported by the scanning head and comprising a plurality of light-detecting sensors disposed equidistant about the central illumination axis and proximate a perimeter of the illumination diffuser, wherein each light-detecting sensor: 1) has a different field of view extending through the window, each field of view at least partially intersecting the central illumination axis and each other field of view at an imaging plane, and 2) is adapted to capture at least one of: light reflected from a target and light emitted from the target;
wherein the imaging engine is adapted to read an image from each of the plurality of light-detecting sensors, and
wherein the imaging engine is further adapted to store the image from each of the plurality of light-detecting sensors in a respective memory partition.

25. The assembly of claim 24, wherein the image comprises an image of at least part of a code physically marked on an object for the life of the object, and wherein the imaging engine is adapted to read the image of at least part of the code from each of the plurality of light-detecting sensors.

26. The assembly of claim 25, wherein the imaging engine is adapted to attempt to decode at least part of the code in the image from each of the plurality of light-detecting sensors, and read information from the image of at least part of the code decoded first.

27. The assembly of claim 24, further comprising a speaker operatively coupled to the imaging engine, wherein the imaging engine is adapted to generate a signal to cause the speaker to emit an audible signal when the imaging engine reads the image from any one of the plurality of light-detecting sensors.

28. The assembly of claim 24, wherein the plurality of light-detecting sensors are disposed uniformly about the central illumination axis and proximate the perimeter of the illumination diffuser.

29. The assembly of claim 24, further comprising a plurality of aiming units each adapted to project an image that at least partially intersects the central illumination axis at the imaging plane.

30. The assembly of claim 29, wherein each aiming unit is disposed proximate a light-detecting sensor.

31. The assembly of claim 29, wherein the plurality of aiming units are disposed uniformly about the central illumination axis.

32. An apparatus comprising:
a housing;
an illumination source at least partially disposed within the housing, and having a central illumination axis; and
an imaging engine supported by the housing, the imaging engine including:
a first light-detecting sensor in a first position and having a first field of view that at least partially intersects the central illumination axis at an imaging plane, the first light-detecting sensor adapted to capture at least one of: light reflected from a target and light emitted from the target; and
a second light-detecting sensor in a second position and having a second field of view that at least partially intersects both the central illumination axis and the first field of view at the imaging plane, the second light-detecting sensor adapted to capture at least one of: light reflected from the target and light emitted from the target, wherein:
at least one of the first and second light detecting sensors is offset from the central illumination axis,
the imaging engine is adapted to read an image from each of the first and second light-detecting sensors, each image comprising an image of at least part of a symbol,
the imaging engine is further adapted to read the image of at least part of the symbol from each of the first and second light-detecting sensors, and
the imaging engine is further adapted to combine the image of part of the symbol from the first light-detecting sensor with the image of part of the symbol from the second light-detecting sensor to form a complete image of the symbol, and read the combined image.

33. The apparatus of claim 32, wherein the imaging engine is adapted to alternately attempt to decode at least part of the symbol in the image of from the first light-detecting sensor and attempt to decode at least part of the symbol in the image of from the second light-detecting sensor, wherein the imaging engine is adapted to read information from the image of at least part of the symbol decoded first.

34. The apparatus of claim 32, wherein the imaging engine is adapted to decode the at least part of the symbol in the image from the first light-detecting sensor and decode the at least part of the symbol in the image from the second light-detecting sensor, wherein the imaging engine is adapted to combine information decoded from each part of the symbol.

35. The apparatus of claim 32, wherein the symbol comprises at least one of: a direct part mark and a symbol provided on a curved surface.

36. The apparatus of claim 32, wherein the first light-detecting sensor is disposed 90 degrees relative to the second light-detecting sensor about the central illumination axis.

37. The apparatus of claim 32, wherein the first light-detecting sensor is disposed 180 degrees relative to the second light-detecting sensor about the central illumination axis.

38. The apparatus of claim 32, wherein the first light-detecting sensor is disposed at least 1 centimeter away from the second light-detecting sensor along a plane perpendicular to the central illumination axis.

39. The apparatus of claim 32, further comprising:
a first aiming unit adapted to project a first image that at least partially intersects the central illumination axis at the imaging plane; and
a second aiming unit adapted to project a second image that at least partially intersects the first image and partially intersects the central illumination axis at the imaging plane.

40. The apparatus of claim 39, wherein the first aiming unit is disposed proximate the first light-detecting sensor and the second aiming unit is disposed proximate the second light-detecting sensor.

41. The apparatus of claim 39, wherein the first aiming unit is disposed 90 degrees relative to the second aiming unit about the central illumination axis.

42. The apparatus of claim 39, wherein the first aiming unit is disposed 180 degrees relative to the second aiming unit about the central illumination axis.

43. The apparatus of claim 32, further comprising an illumination diffuser supported by the housing and having a first aperture and a second aperture, wherein the illumination diffuser is adapted to uniformly diffuse light emitted from the illumination source towards the target.

44. The apparatus of claim 43, wherein:
the first light-detecting sensor is adapted to capture at least one of: light reflected from the target and light emitted from the target through the first aperture, and
the second light-detecting sensor is adapted to capture at least one of: light reflected from the target and light emitted from the target through the second aperture.

45. The apparatus of claim 43, wherein:
the first light-detecting sensor is disposed at least partially within the first aperture, and
the second light-detecting sensor is disposed at least partially within the second aperture.

46. An apparatus comprising:
a housing;
an illumination source at least partially disposed within the housing, and having a central illumination axis; and
an imaging engine supported by the housing, the imaging engine including:
a first light-detecting sensor in a first position and having a first field of view that at least partially intersects the central illumination axis at an imaging plane, the first light-detecting sensor adapted to capture at least one of: light reflected from a target and light emitted from the target; and
a second light-detecting sensor in a second position and having a second field of view that at least partially intersects both the central illumination axis and the first field of view at the imaging plane, the second light-detecting sensor adapted to capture at least one of: light reflected from the target and light emitted from the target,
wherein the imaging engine is adapted to read an image from each of the first and second light-detecting sensors,
wherein at least one of the first and second light detecting sensors is offset from the central illumination axis, and
wherein the first light-detecting sensor is disposed 90 degrees relative to the second light-detecting sensor about the central illumination axis.

47. The apparatus of claim 46, wherein each image comprises an image of at least part of a symbol, and wherein the imaging engine is adapted to read the image of at least part of the symbol from each of the first and second light-detecting sensors.

48. The apparatus of claim 47, wherein the imaging engine is adapted to alternately attempt to decode at least part of the symbol in the image of from the first light-detecting sensor and attempt to decode at least part of the symbol in the image of from the second light-detecting sensor, wherein the imaging engine is adapted to read information from the image of at least part of the symbol decoded first.

49. The apparatus of claim 47, wherein the imaging engine is adapted to decode the at least part of the symbol in the image from the first light-detecting sensor and decode the at least part of the symbol in the image from the second light-detecting sensor, wherein the imaging engine is adapted to combine information decoded from each part of the symbol.

50. The apparatus of claim 47, wherein the symbol comprises at least one of: a direct part mark and a symbol provided on a curved surface.

51. The apparatus of claim 46, wherein the first light-detecting sensor is disposed at least 1 centimeter away from the second light-detecting sensor along a plane perpendicular to the central illumination axis.

52. The apparatus of claim 46, further comprising:
a first aiming unit adapted to project a first image that at least partially intersects the central illumination axis at the imaging plane; and
a second aiming unit adapted to project a second image that at least partially intersects the first image and partially intersects the central illumination axis at the imaging plane.

53. The apparatus of claim 52, wherein the first aiming unit is disposed proximate the first light-detecting sensor and the second aiming unit is disposed proximate the second light-detecting sensor.

54. The apparatus of claim 52, wherein the first aiming unit is disposed 90 degrees relative to the second aiming unit about the central illumination axis.

55. The apparatus of claim 52, wherein the first aiming unit is disposed 180 degrees relative to the second aiming unit about the central illumination axis.

56. The apparatus of claim 46, further comprising an illumination diffuser supported by the housing and having a first aperture and a second aperture, wherein the illumination diffuser is adapted to uniformly diffuse light emitted from the illumination source towards the target.

57. The apparatus of claim 56, wherein:
the first light-detecting sensor is adapted to capture at least one of: light reflected from the target and light emitted from the target through the first aperture, and
the second light-detecting sensor is adapted to capture at least one of: light reflected from the target and light emitted from the target through the second aperture.

58. The apparatus of claim 56, wherein:
the first light-detecting sensor is disposed at least partially within the first aperture, and
the second light-detecting sensor is disposed at least partially within the second aperture.

59. An apparatus comprising:
a housing;
an illumination source at least partially disposed within the housing, and having a central illumination axis; and
an imaging engine supported by the housing, the imaging engine including:
a first light-detecting sensor in a first position and having a first field of view that at least partially intersects the central illumination axis at an imaging plane, the first light-detecting sensor adapted to capture at least one of: light reflected from a target and light emitted from the target; and
a second light-detecting sensor in a second position and having a second field of view that at least partially intersects both the central illumination axis and the first field of view at the imaging plane, the second light-detecting sensor adapted to capture at least one of: light reflected from the target and light emitted from the target,
wherein the imaging engine is adapted to read an image from each of the first and second light-detecting sensors,
wherein at least one of the first and second light detecting sensors is offset from the central illumination axis, and
wherein the first light-detecting sensor is disposed at least 1 centimeter away from the second light-detecting sensor along a plane perpendicular to the central illumination axis.

60. The apparatus of claim 59, wherein each image comprises an image of at least part of a symbol, and wherein the imaging engine is adapted to read the image of at least part of the symbol from each of the first and second light-detecting sensors.

61. The apparatus of claim 60, wherein the imaging engine is adapted to alternately attempt to decode at least part of the symbol in the image of from the first light-detecting sensor and attempt to decode at least part of the symbol in the image of from the second light-detecting sensor, wherein the imaging engine is adapted to read information from the image of at least part of the symbol decoded first.

62. The apparatus of claim 60, wherein the imaging engine is adapted to decode the at least part of the symbol in the image from the first light-detecting sensor and decode the at least part of the symbol in the image from the second light-detecting sensor, wherein the imaging engine is adapted to combine information decoded from each part of the symbol.

63. The apparatus of claim 60, wherein the symbol comprises at least one of: a direct part mark and a symbol provided on a curved surface.

64. The apparatus of claim 59, wherein the first light-detecting sensor is disposed 180 degrees relative to the second light-detecting sensor about the central illumination axis.

65. The apparatus of claim 59, further comprising:
a first aiming unit adapted to project a first image that at least partially intersects the central illumination axis at the imaging plane; and
a second aiming unit adapted to project a second image that at least partially intersects the first image and partially intersects the central illumination axis at the imaging plane.

66. The apparatus of claim 65, wherein the first aiming unit is disposed proximate the first light-detecting sensor and the second aiming unit is disposed proximate the second light-detecting sensor.

67. The apparatus of claim 65, wherein the first aiming unit is disposed 90 degrees relative to the second aiming unit about the central illumination axis.

68. The apparatus of claim 65, wherein the first aiming unit is disposed 180 degrees relative to the second aiming unit about the central illumination axis.

69. The apparatus of claim 59, further comprising an illumination diffuser supported by the housing and having a first aperture and a second aperture, wherein the illumination diffuser is adapted to uniformly diffuse light emitted from the illumination source towards the target.

70. The apparatus of claim 69, wherein:
the first light-detecting sensor is adapted to capture at least one of: light reflected from the target and light emitted from the target through the first aperture, and
the second light-detecting sensor is adapted to capture at least one of: light reflected from the target and light emitted from the target through the second aperture.

71. The apparatus of claim 69, wherein:
the first light-detecting sensor is disposed at least partially within the first aperture, and
the second light-detecting sensor is disposed at least partially within the second aperture.

* * * * *